United States Patent
Gust et al.

(10) Patent No.: US 7,605,216 B2
(45) Date of Patent: Oct. 20, 2009

(54) METHOD OF REDUCING A CONTENT OF A RESIDUAL STYRENE MONOMER IN A POLYOL

(75) Inventors: Karl R. Gust, Troy, MI (US); Joseph P. Borst, Plymouth, MI (US); Heinz P. Plaumann, Brownstown, MI (US)

(73) Assignee: BASF Corporation, Florham Park, NJ (US)

( * ) Notice: Subject to any disclaimer, the term of this patent is extended or adjusted under 35 U.S.C. 154(b) by 491 days.

(21) Appl. No.: 10/985,104

(22) Filed: Nov. 10, 2004

(65) Prior Publication Data

US 2006/0100404 A1    May 11, 2006

(51) Int. Cl.
- C08F 4/28 (2006.01)
- C08F 4/32 (2006.01)
- C08F 12/28 (2006.01)
- C08F 20/44 (2006.01)
- C08F 12/02 (2006.01)

(52) U.S. Cl. ............... 526/227; 526/230.5; 526/310; 526/341; 526/346

(58) Field of Classification Search ............. 526/227, 526/230.5, 310, 341, 346
See application file for complete search history.

(56) References Cited

U.S. PATENT DOCUMENTS

| | | | | |
|---|---|---|---|---|
| 2,732,364 A | * | 1/1956 | Basdekis | 525/279 |
| 4,130,700 A | * | 12/1978 | Kamath | 526/73 |
| 4,431,754 A | * | 2/1984 | Hoffman | 521/137 |
| 4,595,716 A | * | 6/1986 | Woo et al. | 523/403 |
| 4,777,230 A | * | 10/1988 | Kamath | 526/86 |
| 4,804,775 A | * | 2/1989 | Kamath et al. | 558/358 |
| 6,172,164 B1 | | 1/2001 | Davis et al. | |
| 6,455,603 B1 | | 9/2002 | Fogg | |

FOREIGN PATENT DOCUMENTS

| | | |
|---|---|---|
| JP | 2001-294633 | 10/2001 |
| WO | WO 02/085954 A2 | 10/2002 |

OTHER PUBLICATIONS

Atofina Publication—Better Performance In Suspension Polystyrene; pp. 1-4; 2001.
European Search Report for EP 1657273 A1, dated Feb. 8, 2006, 2 pages.
English language translation and abstract for JP 2001-294633, 15 pages, Feb. 7, 2008.

* cited by examiner

*Primary Examiner*—William K Cheung
(74) *Attorney, Agent, or Firm*—Howard & Howard Attorneys PLLC

(57) ABSTRACT

A method of reducing a content of a residual styrene monomer in a polyol utilizes a polyol, a peroxide, an adjustment of temperature, and an application of a vacuum to separate the residual styrene monomer from the polyol. The residual styrene monomer is classified as a volatile organic compound. The peroxide includes monoperoxycarbonates and peroxyketals. Peroxide radicals, present in the peroxide, react with and polymerize the residual styrene monomer to form a polymer having decreased volatility. Applying the vacuum physically separates the residual styrene monomer from the polyol by increasing a vapor pressure of the residual styrene monomer. Separating the residual styrene monomer from the polyol forms an improved polyol which includes less than 20 parts per million of the residual styrene monomer in the polyol.

30 Claims, No Drawings

METHOD OF REDUCING A CONTENT OF A RESIDUAL STYRENE MONOMER IN A POLYOL

FIELD OF THE INVENTION

The subject invention generally relates to a method of reducing a content of a residual styrene monomer in a polyol. More specifically, the subject invention relates to using a peroxide to polymerize the residual styrene monomer in the polyol and using a vacuum to separate the residual styrene monomer from the polyol.

DESCRIPTION OF THE RELATED ART

Methods of reducing a content of residual monomers in polyols are commercially important. Reducing the content of the residual monomers in polyols reduces potential environmental pollution that may accompany usage of the polyols. Some residual monomers that are present in the polyols are classified as volatile organic compounds (VOCs). Examples of typical residual monomers that are classified as VOCs include various substituted and unsubstituted vinyl aromatic monomers such as styrene and para-methyl styrene, esters of acrylic and methacrylic acids, and ethylenically unsaturated nitrites and amides such as acrylonitrile, methacrylonitrile, and acrylamide.

There are two primary methods of reducing the content of residual monomers in polyols that are known in the art. A first prior art method includes applying a vacuum, often in combination with a nitrogen or steam sparge, to mechanically separate, i.e., vacuum strip, the residual monomers from the polyols, thereby reducing the overall content of the residual monomers. A second prior art method does not apply the vacuum and, instead, includes using a peroxide initiator, such as a peroxyketal. Peroxide radicals are present in the peroxide initiator. The peroxide radicals react with and polymerize the residual monomers, also reducing the overall content of the residual monomers in the polyols. Both methods, however, are unable to sufficiently reduce the content of the residual monomers to less than 20 parts per million of the residual monomer in the polyols without a lengthy application of the vacuum or without use of an additional expensive peroxide initiator.

The first prior art method, applying the vacuum, often in combination with the nitrogen or steam sparge, to mechanically reduce the content of the residual monomers in the polyols, uses a reduced pressure that accompanies application of the vacuum and often uses entrainment of the residual monomers in the nitrogen or steam sparge to reduce the content of the residual monomers present in the polyols. More specifically, under the reduced pressure, the residual monomers have relatively high vapor pressures, which facilitate their physical removal from the polyols, thereby decreasing the overall content of the residual monomers. Although the first prior art method may reduce some of the content of the residual monomers in the polyols, the first prior art method is unable to sufficiently reduce the amount of the residual monomers, especially styrene, to less than 20 parts per million of the residual monomer in the polyols, without the lengthy application of the vacuum. Due to unfavorable economics accompanying the lengthy application of the vacuum, the first prior art method is unsuitable for use in applications in which a low content of the residual monomers is required.

The second prior art method, utilizing the peroxide initiator such as the peroxyketal, takes advantage of a reaction between the residual monomer and the peroxide radicals and does not utilize the vacuum to mechanically separate or vacuum strip the residual monomers from the polyols. The reaction between the residual monomer and the peroxide radicals polymerizes the residual monomer. The polymerized residual monomer that is formed has a reduced volatility. Like the first prior art method, however, the second prior art method is also unable to sufficiently reduce the content of the residual monomer to less than 20 parts per million of the residual monomer in the polyol without use of the additional expensive peroxide initiator.

The second prior art method is specifically disclosed in U.S. Pat. No. 4,804,775 to Kamath et al. The '775 patent discloses a method using diperoxyketals and peroxyesters as chaser catalysts. Peroxide radicals are present in the chaser catalysts. The peroxide radicals react with amounts of the residual monomers, such as styrene, that are present in the polyol. Generally, reaction of the peroxide radicals with the residual monomers reduces the content of the residual monomers in the polyol. However, the '775 patent does not use a vacuum, and thus, the chaser catalysts are used to replace the vacuum and reduce the content of the residual monomers in the polyols. The method disclosed in the '775 patent therefore does not sufficiently reduce the content of the residual monomers to less than 20 parts per million of the residual monomer in the polyol. As a result, the method disclosed in the '775 patent is unsuitable for use in applications in which a low content of the residual monomers is required.

SUMMARY OF THE INVENTION AND ADVANTAGES

The subject invention provides a method of reducing a content of a residual styrene monomer in a polyol. The method includes providing the polyol. The method also includes introducing a peroxide to the polyol to form a mixture. The method further includes adjusting a temperature of the mixture to polymerize the residual styrene monomer through reaction of the residual styrene monomer with peroxide radicals present in the peroxide. The method still further includes applying a vacuum to separate the residual styrene monomer from the polyol.

The subject invention can generally be used to reduce the content of the residual styrene monomer in the polyol to less than 20 parts per million of the residual styrene monomer in the polyol through use of the peroxide and application of the vacuum. Specifically, the peroxide radicals react with the residual styrene monomer to polymerize the residual styrene monomer thereby creating a polymer with a reduced volatility and a polymer that includes less volatile organic compounds.

Generally, the method of reducing the content of the residual styrene monomer in the polyol, according to the present invention, allows for an increased industrial production capacity to form the polyol, when needed. Specifically, the method increases the industrial production capacity because utilization of the peroxide reduces an amount of time that the vacuum needs to be applied.

DETAILED DESCRIPTION OF A PREFERRED EMBODIMENT

The subject invention reduces a content of a residual styrene monomer in a polyol and forms an improved polyol. The improved polyol has less than 20 parts per million of the residual styrene monomer in the polyol.

In the present invention, the residual styrene monomer typically includes substituted and unsubstituted vinyl aromatic monomers. More typically, the residual styrene monomer includes styrene, para-methyl styrene, and combinations thereof. Most typically, the residual styrene monomer includes styrene. For descriptive purposes only, a chemical structure of styrene is illustrated below.

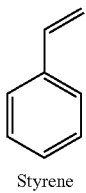

Styrene

However, it is contemplated that the polyol may also include a content of additional monomers. Examples of typical additional monomers include esters of acrylic and methacrylic acids, ethylenically unsaturated nitriles and amides, and combinations thereof. Examples of ethylenically unsaturated nitriles and amides include acrylonitrile, methacrylonitrile, acrylamide, and combinations thereof. Most typically, the polyol may include a content of a residual acrylonitrile monomer.

The residual styrene monomer, as described above, is present in the polyol. The method of the present invention includes the step of providing the polyol that includes the residual styrene monomer. Preferably, the polyol includes polyether polyols, polyester polyols, and combinations thereof. More preferably, the polyol includes a polyether polyol. Most preferably, the polyol includes a dispersion or a solution of addition or condensation polymers, i.e., a graft polyether polyol. Additionally, the dispersion may include styrene.

To reduce the content of the residual styrene monomer in the polyol described above, the method of the present invention includes introducing a peroxide to the polyol to form a mixture. The mixture includes the polyol and the peroxide.

Preferably the peroxide includes the general formula:

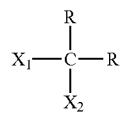

wherein R comprises one of an alkyl group, an oxygen-alkyl group and an oxygen-oxygen-alkyl group; $X_1$ comprises one of an ester group, an oxygen, and an alkyl group; and $X_2$ comprises a methyl group so long as $X_1$ is an ester group. More preferably, the peroxide includes monoperoxycarbonates, peroxyketals, and combinations thereof. Most preferably, the peroxide includes tert-amylperoxy-2-ethylhexyl carbonate, ethyl-3,3-bis(tert-amylperoxy)butyrate, 1,1-Di(tert-amylperoxy)cyclohexane, tert-amylperoxy-2-ethylhexanoate, tert-butylperoxy-2-ethylhexyl carbonate, ethyl-3,3-bis(tert-butylperoxy)butyrate, and combinations thereof. For descriptive purposes only, chemical structures of tert-amylperoxy-2-ethylhexyl carbonate, ethyl-3,3-bis(tert-amylperoxy)butyrate, 1,1-Di(tert-amylperoxy)cyclohexane, tert-amylperoxy-2-ethylhexanoate, tert-butylperoxy-2-ethylhexyl carbonate, and ethyl-3,3-bis(tert-butylperoxy)butyrate are illustrated below.

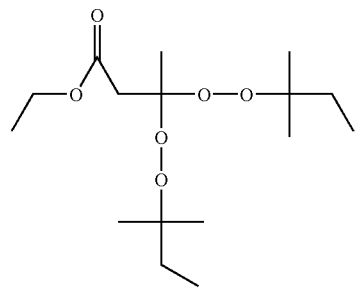

Ethyl-3,3-bis(tert-amylperoxy)butyrate 1,1-Di(tert-amylperoxy)cyclohexane

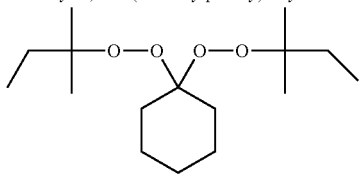

Ethyl-3,3-bis(tert-butylperoxy)butyrate

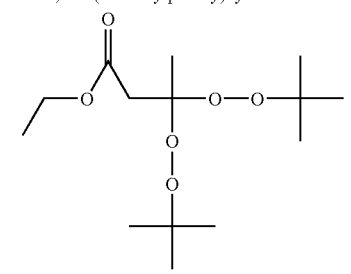

tert-amylperoxy-2-ethylhexyl carbonate tert-butylperoxy-2-ethylhexyl carbonate

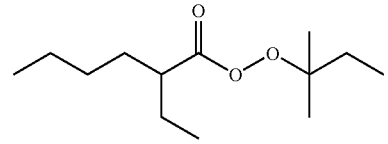

tert-amylperoxy-2-ethylhexanoate

The tert-amylperoxy-2-ethylhexyl carbonate is commercially available from Atofina Corporation of Philadelphia, Pa. under the trade name of Luperox® TAEC and commercially available from Akzo Nobel Corporation of Louisville, Ky. under the trade name of Trigonox® 131. The ethyl-3,3-bis(tert-amylperoxy)butyrate is commercially available from Atofina Corporation of Philadelphia, Pa. under the trade name of Luperox® 533M75. The 1,1-Di(tert-amylperoxy)cyclohexane is commercially available from Atofina Corporation of Philadelphia, Pa. under the trade name of Luperox® 533M80 and commercially available from Akzo Nobel Corporation of Louisville, Ky. under the trade name of Trigonox® 122. The tert-amylperoxy-2-ethylhexanoate is commercially available from Akzo Nobel Corporation of Louisville, Ky. under the trade name of Trigonox® 121. The tert-butylperoxy-2-ethylhexyl carbonate is commercially available from Atofina Corporation of Philadelphia, Pa. under the trade name of Luperox® TBEC and commercially available from Akzo Nobel Corporation of Louisville, Ky. under the trade name of Trigonox® 117. The ethyl-3,3-bis(tert-butylperoxy)butyrate is commercially available from Atofina Corporation of Philadelphia, Pa. under the trade name of Luperox® 233M75 and commercially available from Akzo Nobel Corporation of Louisville, Ky. under the trade name of Trigonox® 185C75.

Without intending to be bound by any particular theory, it is believed that peroxide radicals are present in the peroxide due to decomposition of the peroxide. The peroxide radicals take part in a polymerization reaction, described in greater detail below.

After the peroxide is added to the polyol and the mixture is formed, the method of the present invention includes adjusting a temperature of the mixture. It is contemplated that the temperature of the mixture can be either raised or lowered to achieve a preferred temperature. Preferably, the temperature of the mixture can be adjusted to a range of from 110 to 160, more preferably of from 120 to 150, and most preferably of from 120 to 140° C.

Without intending to be bound by any particular theory, it is believed that once the preferred temperature is achieved, the residual styrene monomer is polymerized through the polymerization reaction of the residual styrene monomer and the peroxide radicals, as first introduced above. If the polyol includes the residual acrylonitrile monomer, it is also believed that, once the preferred temperature is achieved, the residual acrylonitrile monomer is polymerized through the polymerization reaction of the residual acrylonitrile monomer and the peroxide radicals.

Additionally, it is believed that the polymer formed from the reaction of the peroxide radicals and the residual styrene monomer has a reduced volatility such that the polymer includes fewer volatile organic compounds. Similarly, it is also believed that if the polyol includes the residual acrylonitrile monomer, the polymer formed from the reaction of the peroxide radicals and the residual acrylonitrile monomer would also have a reduced volatility.

Preferably, the peroxide radicals are allowed to react with the residual styrene monomer for a time of from 30 to 240, more preferably of from 60 to 180, and most preferably of from 60 to 120 minutes. If the polyol includes the residual acrylonitrile monomer, it is also preferred that the peroxide radicals are allowed to react with the residual acrylonitrile monomer for a time of from 30 to 240, more preferably of from 60 to 180, and most preferably of from 60 to 120 minutes. Once the residual styrene monomer is polymerized, the content of the residual styrene monomer in the polyol is decreased. Consequently, the polyol is improved. Similarly, if the polyol includes the residual acrylonitrile monomer, and the residual acrylonitrile monomer is polymerized, the content of the residual acrylonitrile monomer is also decreased.

To reduce the content of the residual styrene monomer in the polyol, the method of the present invention further includes applying a vacuum to separate the residual styrene monomer from the polyol. If the polyol includes the residual acrylonitrile monomer, the method may also include applying the vacuum to separate the residual acrylonitrile monomer from the polyol.

If the vacuum is applied, the method of the present invention may include adjusting a pressure of the vacuum. If the pressure of the vacuum is adjusted, it is preferred that the vacuum is adjusted to a pressure of from 0.1 to 400, more preferably of from 0.1 to 200, and most preferably of from 0.1 to 65 torr.

The vacuum may be applied to the polyol. If the vacuum is applied to the polyol, the vacuum may be applied to the polyol before, while simultaneously, or after, introducing the peroxide to the polyol to form the mixture. Applying the vacuum to the polyol facilitates separation of the residual styrene monomer or the residual acrylonitrile monomer from the polyol. Additionally, the vacuum may be relieved at any time during the method of the subject invention depending on industrial production needs such as, but not limited to, introducing the peroxide to the polyol.

In addition to applying the vacuum to separate the residual styrene monomer from the polyol, the method of the present invention may also include applying a sparge to facilitate separation of the residual styrene monomer from the polyol. It is also contemplated that applying the sparge may facilitate separation of the residual acrylonitrile monomer from the polyol. Additionally, the sparge may be applied before, while simultaneously, or after, introducing the peroxide to the polyol.

As in known in the art, applying the sparge generally includes bubbling a gas through a solution to remove an undesirable component from the solution. Specifically, according to the method of the present invention, applying the sparge includes bubbling the gas through the polyol. It is also contemplated that, according to the method of the present invention, applying the sparge includes bubbling the gas through the mixture of the peroxide and the polyol. If the sparge is applied according to the method of the present invention, it is preferred that the sparge includes use of nitrogen gas, gaseous water vapor (i.e., steam), and combinations thereof that may be bubbled through the polyol and/or mixture of the peroxide and the polyol.

EXAMPLES

A graft polyol including residual styrene monomers was synthesized according to processes known in the art. Amounts of the residual styrene monomers were measured both prior to and after employing the method of the present invention. The amounts of the residual styrene monomers were measured using column gas chromatography and/or headspace chromatography. Specific components used in the subject invention are set forth in Table 1. Comparative examples are set forth in Table 2.

TABLE 1

| Component | Example 1 | Example 2 | Example 3 |
| --- | --- | --- | --- |
| Polyol 1 (g) | 200 | 200 | |
| Polyol 2 (g) | | | 200 |
| Peroxide 1 (g) | 0.2 | | 0.2 |
| Peroxide 2 (g) | | 0.2 | |
| Reaction Temperature (° C.) | 130 | 130 | 130 |
| Reaction Time (min) | 120 | 120 | 120 |
| Initial Amount of Residual Styrene Monomer (ppm) | 3320 | 3320 | 238 |
| Final Amount of Residual Styrene Monomer (ppm) | 0.0 | 0.0 | 1.0 |
| Atmospheric Pressure (torr) | 760 | 760 | 760 |
| Pressure of the Vacuum (torr) | 45 | 45 | 45 |

TABLE 2

| Component | Comparative Example 1 | Comparative Example 2 | Comparative Example 3 |
|---|---|---|---|
| Polyol 1 (g) | 200 | 200 | 200 |
| Peroxide 1 (g) | 0.2 | | |
| Peroxide 2 (g) | | 0.2 | |
| Reaction Temperature (° C.) | 130 | 130 | 130 |
| Reaction Time (min) | 120 | 120 | 120 |
| Initial Amount of Residual Styrene Monomer (ppm) | 3320 | 3320 | 3320 |
| Final Amount of Residual Styrene Monomer (ppm) | 955 | 780 | 54 |
| Atmospheric Pressure (torr) | 760 | 760 | 760 |
| Pressure of the Vacuum (torr) | N/A | N/A | 45 |

Polyol 1 is a secondary hydroxyl-terminated graft polyether polyol that has not been vacuum stripped. Polyol 1 includes approximately 43 parts by weight of the styrene and acrylonitrile monomers in a 1:2 weight ratio of acrylonitrile:styrene, per 100 parts by weight of the polyol. Polyol 1 is commercially available from BASF Corporation of Wyandotte, Mich. under the trade name of Pluracol® 1442 polyol.

Polyol 2 includes the same formulation as the aforementioned Polyol 1. Polyol 2 was vacuum stripped under a reduced pressure of approximately 45 torr prior to use in Example 3.

Peroxide 1 is tert-amylperoxy-2-ethylhexanoate which is commercially available from Akzo Nobel Corporation of Louisville, Ky. under the trade name of Trigonox® 121.

Peroxide 2 is 1,1-Di(tert-amylperoxy)cyclohexane which is commercially available from Atofina Corporation of Philadelphia, Pa. under the trade name of Luperox® 533M80 and commercially available from Akzo Nobel Corporation of Louisville, Ky. under the trade name of Trigonox® 122.

Initial Amount of Residual Styrene Monomer is a measurement of the initial amount of the residual styrene monomer in the polyol using column gas chromatography and/or headspace chromatography. The measurement was taken before a vacuum was applied and before a peroxide was added to the polyol. The initial amount of the residual styrene monomer is measured in parts per million.

Final Amount of Residual Styrene Monomer is a measurement of the final amount of the residual styrene monomer in the polyol using column gas chromatography and/or headspace chromatography. The measurement was taken after a vacuum was applied and/or a peroxide was added to the polyol. The final amount of the residual styrene monomer is measured in parts per million.

Pressure of the Vacuum is the pressure of the vacuum that was used to separate the residual styrene monomer from the polyol.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of reducing a content of a residual styrene monomer and a residual acrylonitrile monomer in a polyol, said method comprising the steps of:
   providing the polyol comprising the content of the residual styrene monomer and the residual acrylonitrile monomer;
   introducing 1,1-Di(tert-amylperoxy)cyclohexane to the polyol to form a mixture after the step of providing the polyol;
   subsequently raising a temperature of the mixture of the 1-Di(tert-amylperoxy)cyclohexane and the polyol to polymerize the residual styrene monomer in the polyol through reaction of the residual styrene monomer with peroxide radicals present in the 1,1-Di(tert-amylperoxy)cyclohexane and to polymerize the residual acrylonitrile monomer in the polyol through reaction of the residual acrylonitrile monomer with the peroxide radicals; and
   applying a vacuum to separate the residual styrene monomer from the polyol.

2. A method as set forth in claim 1 wherein the residual styrene monomer is selected from the group of substituted vinyl aromatic monomers, unsubstituted vinyl aromatic monomers, and combinations thereof.

3. A method as set forth in claim 1 wherein the residual styrene monomer comprises styrene.

4. A method as set forth in claim 1 wherein the polyol is selected from the group of polyether polyols, polyester polyols, and combinations thereof.

5. A method as set forth in claim 1 wherein the polyol comprises a polyether polyol.

6. A method as set forth in claim 1 wherein the polyol comprises a polyester polyol.

7. A method as set forth in claim 1 wherein the polyol comprises a dispersion of an addition polymer.

8. A method as set forth in claim 7 wherein the dispersion includes styrene.

9. A method as set forth in claim 1 wherein the step of raising the temperature of the mixture comprises raising the temperature to a range of from 120 to 150° C.

10. A method as set forth in claim 1 wherein the step of applying the vacuum comprises adjusting a pressure of the vacuum to of from 0.1 to 200 torr.

11. A method as set forth in claim 1 wherein the step of applying the vacuum comprises applying the vacuum to the polyol.

12. A method as set forth in claim 11 wherein the step of applying the vacuum to the polyol comprises applying the vacuum to the polyol before introducing the 1,1-Di(tert-amylperoxy)cyclohexane to the polyol to form the mixture.

13. A method as set forth in claim 11 wherein the step of applying the vacuum to the polyol comprises applying the vacuum to the polyol while simultaneously introducing the 1,1-Di(tert-amylperoxy)cyclohexane to the polyol to form the mixture.

14. A method as set forth in claim 11 wherein the step of applying the vacuum to the polyol comprises applying the vacuum to the polyol after introducing the 1,1-Di(tert-amylperoxy)cyclohexane to the polyol to form the mixture.

15. A method as set forth in claim 11 wherein the step of applying the vacuum to the polyol comprises the step of adjusting the pressure of the vacuum to of from 0.1 to 200 torr.

16. A method as set forth in claim 11 wherein the step of applying the vacuum to the polyol comprises applying a sparge.

17. A method as set forth in claim 1 wherein the step of applying the vacuum comprises applying a sparge.

18. A method as set forth in claim 1 wherein the peroxide radicals react with the residual styrene monomer for a time of from 60 to 180 minutes.

19. A method as set forth in claim 1 wherein the step of applying the vacuum to separate the residual styrene monomer from the polyol comprises applying the vacuum to separate the residual acrylonitrile monomer from the polyol.

20. A method as set forth in claim 19 wherein the step of applying the vacuum to separate the residual acrylonitrile monomer from the polyol comprises applying a sparge.

21. A method of reducing a content of a residual styrene monomer and a residual acrylonitrile monomer in a polyol, said method comprising the steps of:
provoding the poiyoi comprising the content of the residual styrene monomer and the residual acrylonitrile monomer;
introducing a peroxide to the polyol to form a mixture after the step of providing the polyol;
subsequently raising a temperature of the mixture of the peroxide and the polyol to polymerize the residual styrene monomer in the polyol through reaction of the residual styrene monomer with peroxide radicals present in the peroxide and to polymerize the residual acrylonitrile monomer in the polyol through reaction of the residual acrylonitrile monomer with the peroxide radicals; and
applying a vacuum to separate the residual styrene monomer from the polyol.

22. A method as set forth in claim 21 wherein the peroxide is selected from the group of monoperoxycarbonates, peroxyketals, and combinations thereof.

23. A method as set forth in claim 21 wherein the peroxide is further defined as a peroxyketal.

24. A method as set forth in claim 23 wherein the peroxyketal is selected from the group of ethyl-3,3-bis(tert-amylperoxy)butyrate,1,1-Di(tert-amylperoxy)cyclohexane, ethyl-3,3-bis(tert-butylperoxy)butyrate, and combinations thereof.

25. A method as set forth in claim 21 wherein the peroxide is selected from the group of tert-amylperoxy-2-ethylhexyl carbonate, ethyl-3,3-bis(tert-amylperoxy)butyrate, 1,1-Di(tert-amylperoxy)cyclohexane, tert-amylperoxy-2-ethylhexanoate, tert-butylperoxy-2-ethylhexyl carbonate, ethyl-3,3-bis(tert-butylperoxy)butyrate, and combinations thereof.

26. A method as set forth in claim 21 wherein the peroxide is further defined as a monoperoxycarbonate.

27. A method as set forth in claim 26 wherein the monoperoxycarbonate is selcted from the group of tert-amylperoxy-2-ethylhexyl carbonate, tert-amylperoxy-2-ethylhexanoate, tert-butylperoxy-2-ethylhexyl carbonate, and combinations thereof.

28. A method as set forth in claim 21 wherein the step of applying the vacuum is further defined as applying the vacuum to the polyol before introducing the peroxide to the polyol to form the mixture.

29. A method as set forth in claim 21 wherein the step of applying the vacuum is further defined as applying the vacuum to the polyol while simultaneously introducing the peroxide to the polyol to form the mixture.

30. A method as set forth in claim 21 wherein the step of applying the vacuum is further defined as applying the vacuum to the polyol after introducing the peroxide to the polyol to form the mixture.

* * * * *

UNITED STATES PATENT AND TRADEMARK OFFICE
CERTIFICATE OF CORRECTION

PATENT NO. : 7,605,216 B2  Page 1 of 1
APPLICATION NO. : 10/985104
DATED : October 20, 2009
INVENTOR(S) : Gust et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Fifth Day of October, 2010

David J. Kappos
*Director of the United States Patent and Trademark Office*